(12) United States Patent
Eckstein et al.

(10) Patent No.: US 11,097,766 B2
(45) Date of Patent: Aug. 24, 2021

(54) ACTUATING PART AND CONTROL FOR A MOTOR VEHICLE

(71) Applicant: FKA GmbH, Aachen (DE)

(72) Inventors: Lutz Eckstein, Aachen (DE); Tobias Sandmann, Aachen (DE); Jens Dankert, Aachen (DE)

(73) Assignee: FKA GmbH, Aachen (DE)

( * ) Notice: Subject to any disclaimer, the term of this patent is extended or adjusted under 35 U.S.C. 154(b) by 203 days.

(21) Appl. No.: 16/330,880

(22) PCT Filed: Sep. 7, 2017

(86) PCT No.: PCT/DE2017/100751
§ 371 (c)(1),
(2) Date: Mar. 6, 2019

(87) PCT Pub. No.: WO2018/046064
PCT Pub. Date: Mar. 15, 2018

(65) Prior Publication Data
US 2019/0185040 A1 Jun. 20, 2019

(30) Foreign Application Priority Data
Sep. 7, 2016 (DE) ...................... 10 2016 010 849.5

(51) Int. Cl.
*B62D 1/12* (2006.01)
*B62D 5/00* (2006.01)

(52) U.S. Cl.
CPC ............... *B62D 1/12* (2013.01); *B62D 5/001* (2013.01)

(58) Field of Classification Search
CPC .......... B62D 1/12; B62D 5/001; B62D 6/001; G05G 9/047; G05G 2009/0474
(Continued)

(56) References Cited

U.S. PATENT DOCUMENTS 6,634,454 B2 * 10/2003 Sugitani .................. B62D 1/12
180/333
6,880,855 B2 * 4/2005 Chernoff .................. B60T 7/02
280/778
(Continued)

FOREIGN PATENT DOCUMENTS

CN 1652961 A 8/2005
CN 205365243 U 7/2016
(Continued)

OTHER PUBLICATIONS

International Preliminary Report on Patentability for PCT/DE2017/100751 dated Sep. 7, 2017 (English translation; 7 pages).
(Continued)

*Primary Examiner* — Toan C To
(74) *Attorney, Agent, or Firm* — Bejin Bieneman PLC

(57) ABSTRACT

A control element for a motor vehicle having at least two steerable wheels provides that the actuating force in the transverse direction of the vehicle is measured redundantly by a control element transverse force sensor system and the control element angle is influenced by at least one electromotive control element actuator, whose rotational speed and torque are converted by a control element gearbox. Further, a control for a motor vehicle, provides for averaging the actuating forces exerted in the transverse direction of the vehicle on two control elements and using the averaged forces for influencing the radius of the trajectory of the motor vehicle while the actuating forces exerted in the longitudinal direction of the vehicle on the control elements are used for calculating a desired change of float angle of the motor vehicle.

16 Claims, 2 Drawing Sheets

(58) Field of Classification Search
USPC .......................................... 180/333, 402, 404
See application file for complete search history.

(56) References Cited

U.S. PATENT DOCUMENTS

| | | | | |
|---|---|---|---|---|
| 7,178,613 | B2* | 2/2007 | Yanaka | B62D 1/12 |
| | | | | 180/333 |
| 7,849,954 | B2* | 12/2010 | Onuma | B62D 1/02 |
| | | | | 180/402 |
| 9,676,410 | B2* | 6/2017 | Matsuoka | B62D 17/00 |
| 2002/0063015 | A1 | 5/2002 | Sugitani et al. | |
| 2004/0003954 | A1 | 1/2004 | Sugitani et al. | |
| 2004/0133321 | A1* | 7/2004 | Ghoneim | B60W 30/02 |
| | | | | 701/41 |
| 2004/0256171 | A1 | 12/2004 | Sugitani | |
| 2006/0118350 | A1 | 6/2006 | Suyama | |
| 2007/0221007 | A1* | 9/2007 | Ozaki | B62D 5/006 |
| | | | | 74/484 R |
| 2008/0201037 | A1* | 8/2008 | Suyama | B60W 40/10 |
| | | | | 701/36 |

FOREIGN PATENT DOCUMENTS

| | | |
|---|---|---|
| DE | 19548713 C1 | 5/1997 |
| DE | 19625497 C1 | 10/1997 |
| EP | 1504981 A1 | 2/2005 |
| EP | 1834859 A1 | 9/2007 |
| JP | 2000172358 A | 6/2000 |
| JP | 2003165460 A | 6/2003 |

OTHER PUBLICATIONS

International Search Report and Written Opinion for PCT/DE2017/100751 dated Feb. 26, 2018 (13 pages; with English translation).
Chinese Office Action for Application No. 201780054990.9 dated Jan. 5, 2021 (14 pages; with English machine translation).

* cited by examiner

ACTUATING PART AND CONTROL FOR A MOTOR VEHICLE

CROSS-REFERENCE TO RELATED

This application is a national stage of, and claims priority to, Patent Cooperation Treaty Application No. PCT/DE2017/100751, filed on Sep. 7, 2017, which application claims priority to German Application No. DE 10 2016 010 849.5, filed on Sep. 7, 2016, which applications are hereby incorporated herein by reference in their entireties.

BACKGROUND AND SUMMARY

This application relates to a control element for a motor vehicle having at least two steerable wheels, wherein the actuating force in the vehicle transverse direction is measured redundantly by a control element transverse force sensor system and the control element angle is influenced at least by one electromotive control element actuator, whose rotational speed and torque are converted by a control element gearbox, and a control for a motor vehicle, in which the actuating forces exerted on two of the inventive control elements in the vehicle transverse direction are averaged and used for influencing the radius of the trajectory curve of the motor vehicle, whilst the actuating forces exerted on the control elements in the vehicle longitudinal direction are used for calculating a target float angle change of the motor vehicle. Steerable wheels refer to front wheels, and possibly also rear wheels.

Generic control elements for motor vehicles are already well known from the prior art. For example, DE19548713C1 describes a steering-angle actuating device for a motor vehicle having an operating element for steering-angle adjustment as a function of an associated operating-element actuation variable, in which the adhesion coefficient is taken into account during the calculation of the steering-angle adjustment. DE19625497C1 describes an operating-element arrangement for controlling the longitudinal and the transverse movement of a motor vehicle, having an actuating element, which is arranged in a stationary manner in the vehicle longitudinal manner and can be actuated manually, which is used both for controlling the vehicle longitudinal movement and for influencing the vehicle transverse movement. Furthermore, chassis control systems are known, which monitor and limit the float angle of the vehicle, i.e., the angle between the speed vector at the center of gravity of the vehicle and the vehicle longitudinal axis, within the driving dynamics limits, wherein the limit value may depend on further settings, such as, e.g., a chosen driving mode. In this case, the control of the vehicle is configured such that only one target value for the yaw rate of the vehicle is determined from the steering-wheel angle set by the driver and the current vehicle speed, taking into account, if appropriate, further variables describing the driving state, for example.

The known prior art has a plurality of disadvantages. On the one hand, no technical solution is known that enables a sufficiently safe, play-free, but also cost-effective realization of the active control element principle for vehicle transverse guidance, which ensures that the driver cannot change the control element angle, which is set by the control element actively, by means of a very large actuating force. As the actuating force exerted on the control element forms the basis for the target value formation for the vehicle transverse movement, whilst the control element angle is used for the feedback of the current driving state, for example in the form of the curvature of the trajectory curve of the center of gravity of the vehicle, the latter must not be inadvertently or deliberately influenced by the driver. Furthermore, in a particularly advantageous equipment of a motor vehicle with two control elements, there is a need to prevent the synchrony of the movement of the two control elements from being impaired to a noticeable extent.

On the other hand, the inventor does not know of any control of a road-bound motor vehicle which enables independent influencing of the radius of the trajectory curve on the one hand and the float angle of the motor vehicle on the other hand. Consequently, known controls of motor vehicles only aim to limit the float angle in a suitable manner, but not to influence the float angle in a desired manner independently of the trajectory curve radius. In particular, in light of the increasing introduction of steering systems on the rear axle, which can influence the transverse vehicle dynamics in addition to a steering system on the front axle, the lack of targeted influencing of the vehicle float angle constitutes a serious disadvantage, not only at higher driving speeds and transverse accelerations, but also for example when parking and maneuvering.

The invention is based on the technical problem of developing a control element and a control for a motor vehicle, in order to overcome at least one of the previously mentioned disadvantages. The problem is solved by a control element and a control as disclosed and claimed.

The disclosure herein builds on the generic prior art in that the control element is designed to be movable only in the vehicle transverse direction and in that two control elements are used for controlling the motor vehicle. In this case, the control elements are preferably mounted in a rotatable manner about the longitudinal axis of the vehicle. In contrast to the known prior art, the actuating force in the vehicle transverse direction is measured redundantly by means of a control element transverse force sensor system or a control element torque sensor system, and is used as the basis for calculating a target value for the vehicle transverse movement, which is advantageous with respect to the phase behavior between vehicle reaction and actuation variable. A conventionally controlled motor vehicle only changes direction if a change of the steering-wheel angle is set owing to the torque, which the driver exerts on the steering wheel. Herein, the forces, which are exerted on the control elements in the vehicle transverse direction, are used as a target value specification, in a particularly advantageous embodiment after they are averaged and filtered using a speed-dependent first-order filter. Due to the speed dependence of the filtering of the averaged actuating force in the vehicle transverse direction, it is taken into account that the phase delay between wheel steering angle and yaw rate of the motor vehicle grows with increasing driving speed. Consequently, it is advantageous to continuously reduce the filter constant with increasing driving speed, for example.

In a further advantageous embodiment, the relationship between filtered force and target value for the steering is configured in a speed-dependent manner, so that on the one hand, in the case of low vehicle speeds, the control element forces for specifying large steering angles do not become too large and on the other hand, in the case of high vehicle speeds, the control element forces for specifying very small steering angles do not become too small.

Furthermore, in order to make the currently prevailing adhesion coefficient between tires and roadway noticeable, in a further advantageous embodiment, the necessary force for creating a certain steering angle can be configured as a function of the friction coefficient. If the adhesion coefficient is low, the driver requires a lower force in order to induce the same steering angle as in the case of a higher adhesion coefficient. The adhesion coefficient can be estimated for example on the basis of the power consumption of the wheel steering angle adjuster.

Furthermore, the control element angle, which is used as feedback for the driver, is influenced by a combination of an electric control element actuator and a control element gearbox, so that even in the case of large actuating forces the control element can also set a control element angle corresponding to the driving state.

In a particularly advantageous embodiment, the target value for the control element angle used as feedback is composed of a plurality of portions.

In an advantageous embodiment of the feedback, one portion of the target value for the control element angle at low vehicle speeds is based on the averaged steering angle of the front wheels. As a result, the driver can for example perceive if the front wheels cannot be turned as desired because of a curb.

Since the transverse vehicle dynamics are additionally influenced by the self-steering behavior of the motor vehicle with increasing driving speed, it has been established in road tests to be particularly advantageous to choose the current curvature of the trajectory curve of the center of gravity of the vehicle as feedback alternatively to the feedback of the average wheel steering angle. Since it is not always trivial to determine the real curvature of the trajectory curve traveled, the curvature of the trajectory curve of the center of gravity of the vehicle can be calculated in a simplified manner for example, with the aid of the single-track model on the basis of the average wheel steering angle, the driving speed and the self-steering gradient of the motor vehicle.

Since this rough calculation is no longer relevant within driving dynamic limits, that is to say in the case of a relatively large float angle, in a further, particularly advantageous configuration of the calculation of the target value for the control element angle, a further portion is additionally taken into account, which makes oversteering perceptible in the form of an additional control element angle. To this end, the deviation between measured yaw rate and the yaw rate calculated with the aid of the single-track model or the change of this difference can for example be suitably scaled and added to the control element target angle.

In a particularly advantageous design, the actuating force of the driver in the vehicle transverse direction is measured at least three times, in order to be able to identify a defective measuring transducer. This becomes possible for example by means of a comparison in pairs of two of the at least three measured values in each case, as in the case of a defective transducer, only one comparison of two intact sensors gives a deviation, which is smaller than a defined tolerance threshold. In order to exclude multiple faults with a common cause, it furthermore appears advantageous to implement different measurement principles, for example on the basis of strain gages, piezoelectric sensors and Hall effect sensors.

In a further advantageous design, the control element gearbox comprises at least one so-called strain wave gearing, which is known from robotics and is characterized by large transmission ratios of, for example, 1:100 in the case of the practical absence of play. Thus, a very small control element actuator with low electrical power consumption can be selected, which is additionally lightweight and occupies little installation space. Alternatively, worm gearboxes may be used, which are known for example from electrical power-steering systems.

In order either to further reduce the power of the control element actuator and/or increase the tolerable actuating force, in a further advantageous design, the control element is supplemented by a control element brake, which brakes either the control element actuator or the control element handle. The control element brake is activated for example if a suitable algorithm detects that the actuating force of the driver increases strongly in such a manner, that the actuating force threatens to exceed the control element force which can be generated on the part of the control element actuator in combination with the control element gearbox. In a further advantageous embodiment, this control element brake can be constructed as currentless closed, so that the control element position is defined when the vehicle is parked.

In a further particularly advantageous embodiment, not only the actuating force in the vehicle transverse direction, but rather additionally the actuating force in the vehicle longitudinal direction is redundantly measured. This longitudinal force can be used as a basis for target value specification for further functions. A satisfactory redundancy of the measurement makes it possible to address even safety-relevant functions, such as, e.g., a vehicle deceleration, by regulating the recuperation torque of electric drives. This enables the driver to consciously initiate a vehicle deceleration in the course of which kinetic energy is recovered in the form of electric current through the generator operation of the electric vehicle drive. Alternatively, for example, an emergency braking function could be implemented for automated vehicles. In this case, it appears advantageous that the control elements are always easily reachable and visible for the driver, whilst it does not appear possible to reliably find or actuate the brake pedal if the body position is changed slightly during the automated ride. Particularly preferably, both the regulation of the recuperation torque and the emergency brake function can be controlled by means of the longitudinal force. For this, e.g., a threshold value may be provided for the longitudinal force, wherein the emergency braking function is activated and the friction brake is engaged if the threshold value is exceeded. Below the threshold value, a deceleration only takes place by means of the regulation of the recuperation torque. The maneuverability of the control elements in the longitudinal direction is preferably substantially lower than the maneuverability in the vehicle transverse direction. The maneuverability in the longitudinal direction is preferably less than 10% of the maneuverability in the vehicle transverse direction. Preferably, no perceptible maneuverability of the control elements in the longitudinal direction is provided. The actuating forces in the longitudinal direction in this case only effect an elastic bending of the respective control elements in the longitudinal direction.

Moreover, a control system for a motor vehicle can comprise at least two steerable front wheels, which allows independent control of the radius of the trajectory curve driven and of the vehicle's float angle by averaging the actuating forces exerted on two control elements in the transverse direction of the vehicle and using them to influence the radius of the trajectory of the motor vehicle, while the actuating forces exerted on the control elements in the longitudinal direction of the vehicle are used to calculate a desired change in the vehicle's float angle. This enables the driver, for example, to specifically reduce the change in the yaw angle of the vehicle during a lane change by commanding a float angle via the difference between the longitudinal forces exerted on the control elements which is opposite to the trajectory curve radius calculated on the basis of the sum of the control element transverse forces, or to consciously increase the float angle during rapid cornering. When cornering slowly, such as driving into a car park, the driver can also use the additional degree of freedom with regard to influencing the driving condition to reduce the vehicle's road width requirement and thus avoid a potential collision of the inside of the corner with an obstacle. Furthermore, it would be conceivable during parallel parking to use a difference in the longitudinal forces on the right and left control element, in order to directly or indirectly influence rear-wheel steering, so that the driver can parallel park the vehicle during forwards travel in the case of sufficiently large available steering angles at the rear axle.

In a particularly advantageous embodiment of the control, the target float angle change of the motor vehicle depends on the amount and the sign of the forces exerted on the two control elements in the vehicle longitudinal direction, so that the driver can specify the float angle of the vehicle in both directions in a finely definable manner. In this case, it is also conceivable to only calculate a target value for the float angle of the motor vehicle, if the driver applies an oppositely orientated force on both control elements or at least actuates both control elements.

In a further advantageous embodiment of the control, the target float angle change is set at least by a suitable combination of steering angle changes of the steered wheels or by a combination of steering angle changes on individual wheels as well as by driving torques and/or braking torques on one or more wheels. If both the wheels of the front axle and the wheels of the rear axle are steerable, the float angle can be influenced, in any driving situation, independently of the trajectory curve radius, for example even in the case of driving in a straight line. It is possible for example to dispense with rear-wheel steering, if the vehicle has wheel brakes which can be actuated in a selective manner, wherein in this case, the control of the float angle, which is independent of the trajectory curve radius, is possible within driving dynamic limits in particular.

Further advantages, objectives and features of this invention are explained by attached drawings and the following description, in which an example of a steering system according to the invention is presented and described.

DETAILED DESCRIPTION WITH REFERENCE TO THE DRAWINGS

Figure 1:
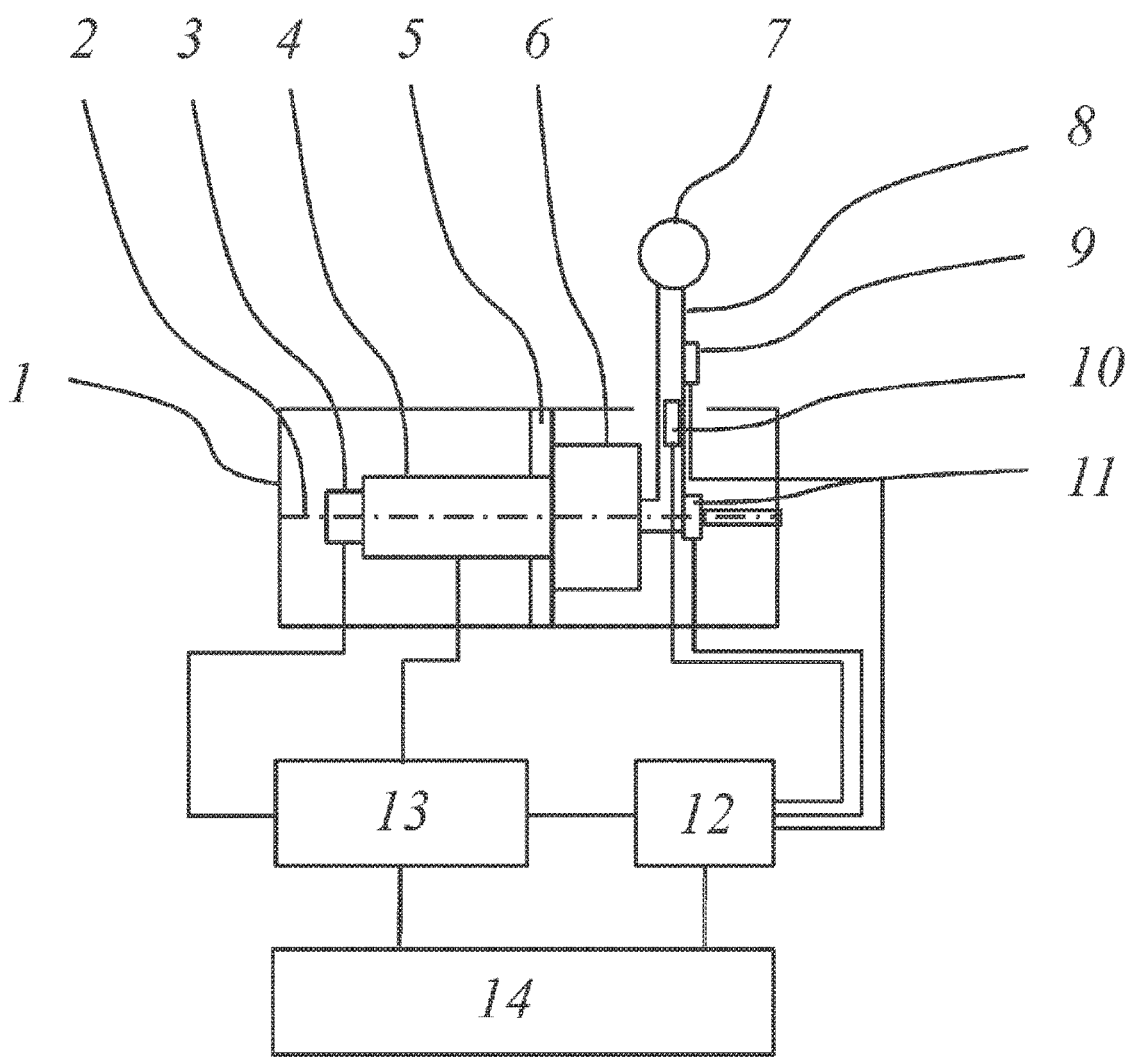
FIG. 1 schematically shows a side view of an exemplary embodiment of the control element including an electronic unit for calculating transverse dynamic target values, a further unit for synthesizing a target value for the control element angle and for controlling the control element actuator and the control element brake, as well as a vehicle computer, which communicates with both units.

The exemplary control element shown in FIG. 1 has a control element housing 1, in which a control element brake 3, a control element actuator 4 and a control element gearbox 6 are arranged, wherein the control element actuator and the control element gearbox are schematically connected to the control element housing by an actuator and gearbox holder 5. The rotational speed and torque of the control element actuator 4 are converted by the control element gearbox 6, resulting in a pivoting movement of the control element arm 8 about the control element rotational axis 2. The forces exerted on the control element handle 7 are detected by the control element transverse force sensor system 10 as illustrated, in the control element transverse direction, and also by the control element longitudinal force sensor system 9 in the control element longitudinal direction, wherein both sensor systems contain sensors which are redundant and ideally of diversified design. The control element angle sensor 11 is used for measuring the control element angle, which can be used, inter alia, for regulating the same. The unit labeled with 12 is used for calculating suitable target values at least for the vehicle transverse movement on the basis of the forces determined by the control element longitudinal force sensor system 9 and the control element transverse force sensor system 10, wherein in a particularly advantageous design according to the invention, a difference is made between a target value for the trajectory curve radius and a target value for the float angle of the vehicle. Further driving-state variables can be included in the calculation, which can be provided by the vehicle computer 14 illustrated by way of example. The feedback synthesis illustrated by way of example as a separate unit 13 in FIG. 1 comprises at least one algorithm, which for example determines a target value for the control element angle on the basis of state variables determined by the vehicle computer 14 and/or values of the target-value calculation 12. In this exemplary embodiment, the vehicle computer 14 is responsible for implementing as far as possible the target values for the trajectory curve radius and for the float angle provided by the target value calculation 12 by suitable selection and control of the steering actuators and, if necessary, the drive and/or braking torques of individual wheels.

In an alternative, advantageous design, the algorithms for target-value calculation and feedback synthesis are not distributed to separate units or control devices, but rather integrated in a suitable manner into other control devices and additionally realized in a multiply redundant manner, in order to achieve a satisfactory degree of functional reliability.

Figure 2:
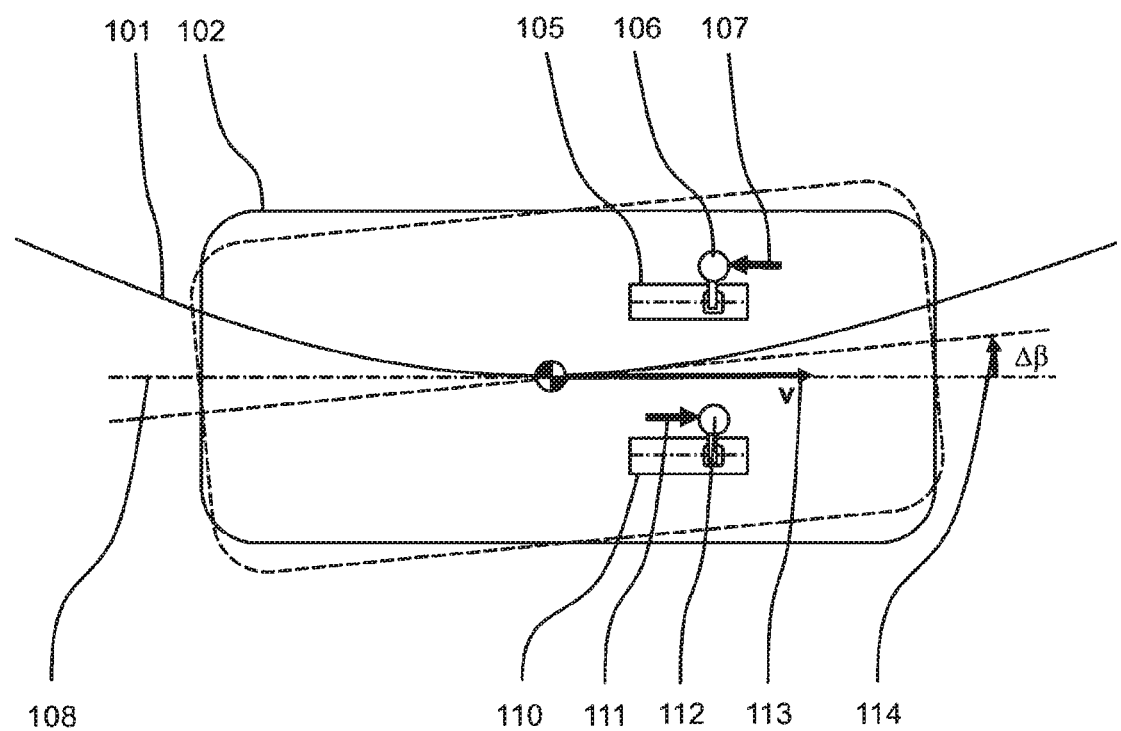
FIG. 2 schematically shows an exemplary driving situation, in which a motor vehicle equipped with two control elements passes through a left-hand bend, wherein the vehicle is additionally drawn in an intended vehicle position with a dashed line.

FIG. 2 schematically shows an exemplary driving situation, in which a motor vehicle moves along a trajectory curve 101 with a driving speed 113 tangential to the trajectory. The current vehicle position 102 of the motor vehicle equipped with two inventive control elements 105, 110 is labeled in FIG. 2 by an unbroken line. The current vehicle longitudinal axis 108 is congruent with the current vehicle speed vector 113 of the motor vehicle, so that the float angle in the current driving state illustrated by way of example is zero. If the driver exerts a longitudinal force 107, counter to the vehicle speed, on the handle of the left control element 106, whilst they apply a longitudinal force 111 in the direction of the vehicle speed to the right control element handle labeled with 112, the intended float angle change $\Delta\beta$ labeled with 114 results from that in the illustrated example.

In a particularity advantageous design, it is not sufficient to exert a force in the longitudinal direction only on one of the two control elements 105, 110, in order to command a float angle change, as this could lead to an inadvertent change of the float angle. Furthermore, it is advantageous, in addition to the longitudinal forces on the right and left control element handle 107, 111, to include further driving state variables, such as for example the vehicle speed, in the calculation of the intended float angle change.

The invention claimed is:

1. A control element for controlling a motor vehicle having at least two steerable wheels;
   wherein the control element is movable in a transverse direction of the vehicle and an actuating force is measurable in the transverse direction of the vehicle by one or both of a control element transverse force sensor system and a control element torque sensor system, and is a basis for calculating a target value for the transverse movement of the vehicle, while a control element angle of the control element is governable at least by an electromotive control element actuator whose rotational speed and torque are convertible by a control element gearbox; and
   wherein, in addition to the actuating force in the transverse direction of the vehicle, an actuating force in the longitudinal direction of the vehicle is measurable by a control element longitudinal force sensor system.

2. The control element as claimed in claim 1, wherein the actuating force in the transverse direction of the vehicle is repeatedly measurable.

3. The control element as claimed in claim 1, wherein the control element gearbox comprises a harmonic drive or a worm gearbox.

4. The control element as claimed in claim 1, wherein the control element angle is governable by a control element brake such that a change of the control element angle by a high force of the driver on a control element handle against a torque of the control element actuator converted by the control element gearbox can be prevented.

5. A control for a motor vehicle having at least two steerable front wheels and two control elements,
   wherein each control element is movable in a transverse direction of the vehicle and an actuating force is measurable in the transverse direction of the vehicle by one or both of a control element transverse force sensor system and a control element torque sensor system, and is a basis for calculating a target value for transverse movement of the vehicle, while a control element angle of each control element is governable at least by an electromotive control element actuator whose rotational speed and torque are convertible by a control element gearbox;
   wherein the actuating forces exerted on each control element in the transverse direction of the vehicle are averaged and filtered using a speed-dependent filter at least of first order, wherein the averaged and filtered actuating force is provided as a target value specification for the transverse movement of the vehicle and thus for influencing the radius of the trajectory of the motor vehicle.

6. The control as claimed in claim 5, wherein a speed-dependent relationship is specified between the filtered, averaged actuating force and the target value specification for the steering in such a way that, in the case of low driving speeds, the control element forces for specifying large steering angles are limited upwards and, in the case of high driving speeds, the control element forces for specifying small steering angles are increased.

7. The control as claimed in claim 5, wherein an actuating force required for generating a specific steering angle is determined as a function of an adhesion coefficient between tire and roadway determined by a sensor system, wherein a smaller actuating force is required for a defined steering angle for a small adhesion coefficient than for a high adhesion coefficient.

8. The control as claimed in claim 5, wherein the calculation of a target value for the control element angle comprises a plurality of portions, wherein at least one portion is an averaged wheel steering angle of the first and second front wheels.

9. The control as claimed in claim 8, wherein one portion is a current or expected curvature of a trajectory of the center of gravity of the vehicle.

10. The control as claimed in claim 8, wherein a further portion is provided, which makes oversteering of the vehicle perceptible in the form of an additional portion of the actuating angle at one or both of the first and the second control element, wherein this portion is formed with a weighting by a difference between measured yaw rate and a yaw rate calculated by one or both of a single-track model and a change of the difference.

11. The control as claimed in claim 5, wherein the actuating forces exerted on the control elements in the longitudinal direction of the vehicle are provided for calculating a target change in the float angle of the motor vehicle.

12. The control as claimed in claim 11, wherein the target change in the float angle of the motor vehicle depends on the amount and the sign of the forces exerted on the two control elements in the longitudinal direction of the vehicle.

13. The control as claimed in claim 11, wherein the target change in the float angle is set at least by a suitable combination of steering angle changes of the steered wheels or by a combination of steering angle changes on individual wheels as well as by driving torques and/or braking torques on one or more wheels.

14. The control as claimed in claim 11, wherein a recuperation torque is specified and controlled by at least one of the actuating forces on the control elements in the longitudinal direction of the vehicle.

15. The control as claimed in claim 11, wherein a friction brake of the vehicle is controlled by at least one of the actuating forces on the control elements in the longitudinal direction of the vehicle if at least one of the actuating forces exceeds a threshold value.

16. A motor vehicle comprising at least two steerable front wheels and two control elements,
   wherein each control element is movable in a transverse direction of the vehicle and an actuating force is measurable in the transverse direction of the vehicle by one or both of a control element transverse force sensor system and a control element torque sensor system, and is a basis for calculating a target value for transverse movement of the vehicle, while a control element angle of each control element is governable at least by an electromotive control element actuator whose rotational speed and torque are convertible by a control element gearbox;
   wherein the actuating forces exerted on each control element in the transverse direction of the vehicle are averaged and filtered using a speed-dependent filter at least of first order, wherein the averaged and filtered actuating force is provided as a target value specification for the transverse movement of the vehicle and thus for influencing the radius of the trajectory of the motor vehicle.

* * * * *